(12) United States Patent
Surnilla et al.

(10) Patent No.: US 10,087,860 B2
(45) Date of Patent: Oct. 2, 2018

(54) ENGINE COLD-START CONTROL

(71) Applicant: Ford Global Technologies, LLC, Dearborn, MI (US)

(72) Inventors: Gopichandra Surnilla, West Bloomfield, MI (US); Jianwen James Yi, West Bloomfield, MI (US); Steven Wooldridge, Saline, MI (US); Alexander O'Connor Gibson, Ann Arbor, MI (US); Gary Alan Coulson, Ypsilanti, MI (US); Foo Chern Ting, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 291 days.

(21) Appl. No.: 14/817,945

(22) Filed: Aug. 4, 2015

(65) Prior Publication Data

US 2017/0037803 A1    Feb. 9, 2017

(51) Int. Cl.
  *F02D 41/06*     (2006.01)
  *F02D 9/02*      (2006.01)
  (Continued)

(52) U.S. Cl.
  CPC ............ *F02D 41/064* (2013.01); *F02D 9/02* (2013.01); *F02D 37/02* (2013.01); *F02D 41/0007* (2013.01); *F02D 41/047* (2013.01); *F02D 41/3836* (2013.01); *F02D 41/402* (2013.01); *F02P 5/045* (2013.01); *F02D 2009/0228* (2013.01); *F02D 2009/0249* (2013.01); *F02D 2200/021* (2013.01); *F02D 2200/0414* (2013.01); *F02D 2200/0606* (2013.01); *F02D 2200/0611* (2013.01); *F02D 2200/0802* (2013.01); *F02D 2200/602* (2013.01);
  (Continued)

(58) Field of Classification Search
  CPC .. F02D 41/064; F02D 41/047; F02D 41/3836; F02D 41/402; F02D 37/02; F02D 41/0007; F02D 9/02; F02D 2200/0611; F02D 2200/0414; F02D 2200/021; F02D 2200/0802; F02D 2200/602; F02D 2200/0606; F02D 2009/0249; F02D 2009/0228; F02P 5/045; F02P 5/1506; Y02T 10/44; Y02T 10/144
  See application file for complete search history.

(56) References Cited

U.S. PATENT DOCUMENTS 7,303,144 B2 * 12/2007 Alyanak ............... F01N 11/002
                                                       239/533.12
7,778,767 B2    8/2010 Santoso et al.
(Continued)

FOREIGN PATENT DOCUMENTS

EP          2647816 A2 * 10/2013    ........... F02D 41/064

*Primary Examiner* — David Hamaoui
(74) *Attorney, Agent, or Firm* — Julia Voutyras McCoy Russell LLP (57) ABSTRACT

Methods and systems are provided for improving engine startability during cold-start conditions, when operating with gasoline fuels, alcohol fuels, or blended fuels. In one example, a method of engine cold-start control may include initiating fuel injection for cylinder combustion with manifold pressure lowered via intake throttle adjustments. The manifold pressure is lowered based on an optimization between cylinder charge reduction and improved fuel boiling at the lower pressure.

17 Claims, 5 Drawing Sheets

(51) Int. Cl.
  *F02D 41/04* (2006.01)
  *F02D 41/38* (2006.01)
  *F02D 41/40* (2006.01)
  *F02P 5/04* (2006.01)
  *F02D 37/02* (2006.01)
  *F02D 41/00* (2006.01)
  *F02P 5/15* (2006.01)

(52) U.S. Cl.
  CPC ........... *F02P 5/1506* (2013.01); *Y02T 10/144* (2013.01); *Y02T 10/44* (2013.01)

(56) References Cited

U.S. PATENT DOCUMENTS

| | | | |
|---|---|---|---|
| 8,447,496 B2 * | 5/2013 | Krengel | F02D 19/061 123/304 |
| 2011/0184625 A1 | 7/2011 | Christ et al. | |
| 2013/0276756 A1 | 10/2013 | Leone et al. | |
| 2014/0172275 A1 | 6/2014 | Surnilla et al. | |

* cited by examiner

ENGINE COLD-START CONTROL

FIELD

The present description relates generally to methods and systems for improving cold-start control of a vehicle engine.

BACKGROUND/SUMMARY

Startability of engines fueled with gasoline during cold ambient conditions (also known as an engine cold-start) may be an issue due to the difficultly of evaporating sufficient fuel to provide a combustible air-fuel ratio. In particular, the larger amount of time required to evaporate the fuel may degrade engine startability. The issue may be exacerbated when the engine is fueled with alternate fuels, such as ethanol fuels (e.g., E85, E100, etc.). Therein, the additional charge cooling effect of the alcohol fuel can lower the intake aircharge temperature at cold-start conditions, further degrading combustion stability and increasing potential for engine misfire.

One example approach for improving engine startability during cold conditions is shown by Krengel et al. in U.S. Pat. No. 8,447,496. Therein, during an engine cold-start, at least a portion of fuel is direct injected during a compression stroke, and a remainder of the fuel is direct injected during the intake stroke. Further, the portion of fuel delivered as a compression stroke injection is increased as the alcohol content of the injected fuel increases. By delivering at least some fuel as a compression stroke injection, the higher air-charge temperature of the engine during the compression stroke is leveraged to improve fuel evaporation.

However, the inventors herein have recognized potential issues with such a system. As one example, even with fueling during the compression stroke, at low ambient conditions, there may not be sufficient charge temperature to evaporate the fuel for engine starting. The inventors herein have further recognized that, even when fueling is delivered during a compression stroke, the fuel evaporation is driven by difference in temperature between the boiling point of a fuel and an aircharge temperature during a compression stroke. However, the boiling point of the fuel is a function of the aircharge pressure during the compression stroke. If the fuel boiling point can be reduced while keeping the aircharge temperature the same, the evaporation of the fuel can be enhanced.

Thus, in one example, the issues described above may be addressed by a method for improving engine startability comprising: during an engine cold-start, determining a fuel injection including an amount of fuel and a timing of injection based on engine operating conditions; and lowering manifold pressure for a first combustion event in engine cylinder during the cold-start based on an estimate of fuel temperature at an end of the injection. Herein, the fuel injection includes a single compression stroke injection. In this way, fuel evaporation during a cold-start is improved.

As one example, on a first combustion event of each cylinder during an engine cold-start, fuel may be delivered as a single compression stroke injection. In addition, manifold pressure may be lowered for the first combustion event in each cylinder by reducing an intake throttle opening. Specifically, manifold pressure may be lowered to a value that is optimized based on the effect of the reduced manifold pressure on each of fuel boiling point and aircharge volume, the optimization enabling a combustion air-fuel ratio to be maintained at a target value (such as at or near stoichiometry). As such, when the manifold pressure is reduced, the compression pressure is also reduced. The reduced pressure reduces the boiling point of the fuel being delivered. Since the temperature of the aircharge during the compression stroke is independent of the manifold pressure, it remains the same, resulting in an isentropic compression stroke injection. The fuel temperature then changes during the compression stroke as a function of the initial temperature of the aircharge before compression. As a result, by reducing the boiling point via application of a lower manifold pressure while keeping the charge temperature the same, the evaporation of the fuel is enhanced. At the same time, the lowering of the manifold pressure reduces the volume of the aircharge in the cylinder, reducing the amount of fuel required to be evaporated to maintain a given air-fuel ratio. On a second combustion event of each engine cylinder, the manifold pressure may then be raised (e.g., to nominal levels). By iteratively optimizing a manifold pressure set-point based on the reduced need for fuel and the improved fuel evaporation at the lower manifold pressure, the target air-fuel ratio can be achieved more easily at the engine cold-start.

The technical effect of lowering the boiling point of a fuel during cold ambient conditions by lowering manifold pressure, while keeping the charge temperature the same, is that a larger difference between fuel boiling point and aircharge temperature is achieved. As a result, fuel may be effectively evaporated to form a combustible/stoichiometric air-fuel mixture. By optimizing the set-point to which the manifold pressure is lowered on a first combustion event in each engine cylinder (during an engine restart) based on a balance between a reduction in the amount of cylinder charge (and therefore a reduction in the amount of fuel required in the cylinder) and an enhancement in fuel evaporation, engine startability at colder temperatures can be improved, even when alcohol fuels are used, without degrading engine torque output, or exhaust emissions. Additionally, by evaporating most of the injected fuel, less fuel may be lost during engine operation, and the need for larger or pilot fuel injections at engine cold-start may be reduced or eliminated. As such, this may provide fuel economy benefits as well as reduced cold-start exhaust emissions. In addition, the occurrence of engine misfires during an engine cold-start are decreased. Further, by maintaining use of compression injection on the first combustion event of a cold-start, it is possible to maintain repeatable engine speed profiles.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for improving an engine's ability to start with gasoline and alcohol-based fuels (such as the engine of FIG. 1) at cold ambient temperatures. An engine controller may be configured to perform a control routine, such as the example routine of FIG. 2, during an engine cold start, to lower manifold pressure and inject fuel during a compression stroke while operating at the lower manifold pressure. By lowering the manifold pressure based on an estimated temperature of the fuel at the end of the fuel injection (FIGS. 3-4), fuel evaporation and formation of a combustible air-fuel mixture at cold-start may be improved. Example cold-start operations are shown with reference to FIGS. 5-6. By reducing fuel losses incurred during cold-start, the fuel efficiency and quality of vehicle cold-start exhaust emissions may be significantly improved.

Figure 1:
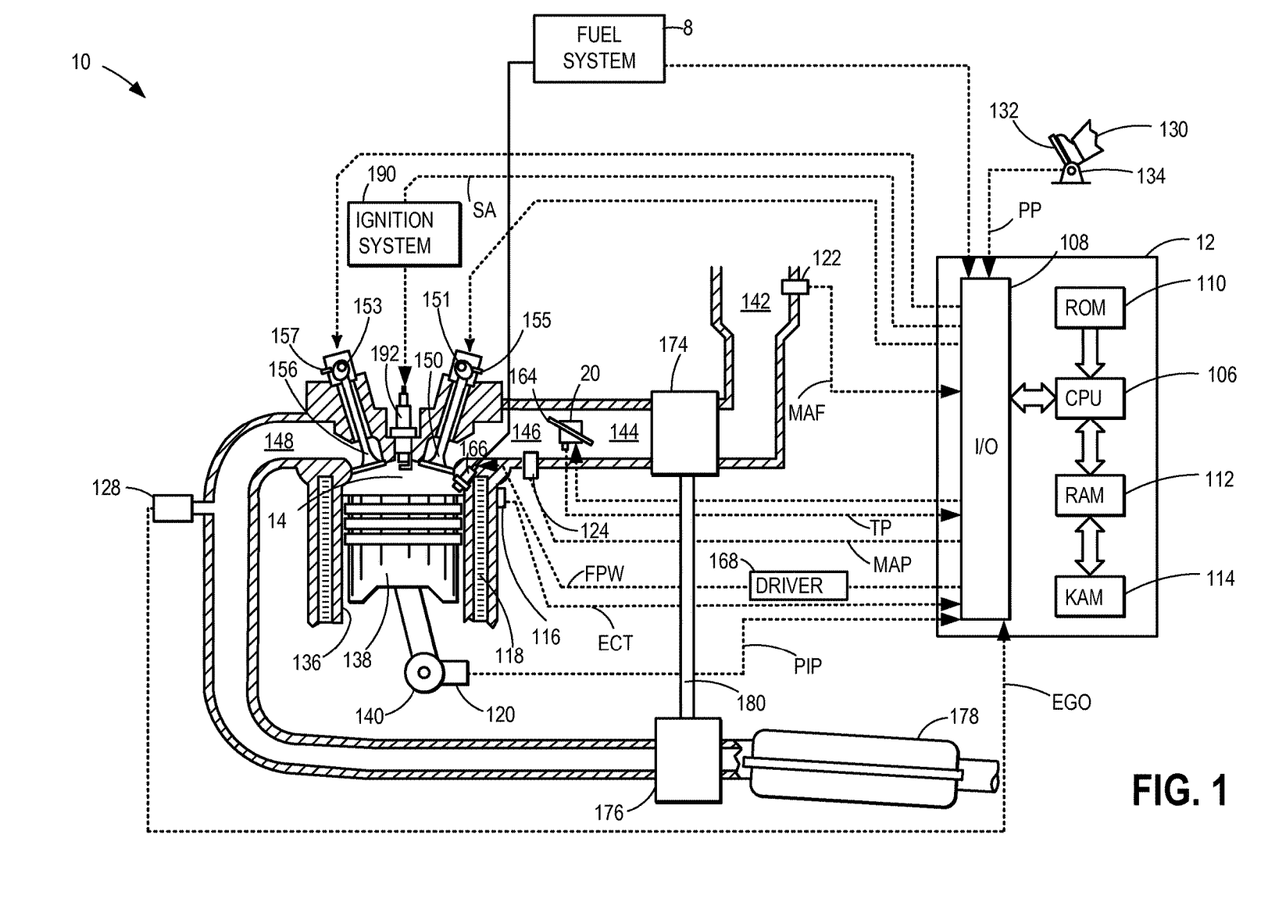
FIG. 1 shows an example embodiment of a combustion chamber.

FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while in one embodiment, the engine may be operated by injecting the variable fuel blend via a single direct injector; in alternate embodiments, the engine may be operated by using two injectors (a direct injector and a port injector) and varying a relative amount of injection from each injector.

Fuel may be delivered by the injector to the cylinder during a single cycle of the cylinder. Further, the distribution and/or relative amount of fuel delivered from the injector may vary with operating conditions, such as air charge temperature, fuel alcohol content, ambient temperature, etc., as described herein below. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc. In one example, fuels with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline, a mixture of ethanol, methanol and water, etc. In still another example, both fuels may be alcohol blends wherein the first fuel may be a gasoline alcohol blend with a lower ratio of alcohol than a gasoline alcohol blend of a second fuel with a greater ratio of alcohol, such as E10 (which is approximately 10% ethanol) as a first fuel and E85 (which is approximately 85% ethanol) as a second fuel. Additionally, the first and second fuels may also differ in other fuel qualities such as a difference in temperature, viscosity, octane number, latent enthalpy of vaporization etc.

Moreover, fuel characteristics of the fuel tank may vary frequently. In one example, a driver may refill the fuel tank with E85 one day, and E10 the next, and E50 the next. The day to day variations in tank refilling can thus result in frequently varying fuel compositions, thereby affecting the fuel composition delivered by injector 166.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. The controller may receive input data from the various sensors, process the input data, and employ the various actuators based on the received signals and instructions stored on a memory of the controller. The controller may employ the actuators in response to the processed input data based on instruction or code programmed therein corresponding to one or more routines, such as example control routines described herein with regard to FIG. 2.

Figure 2:
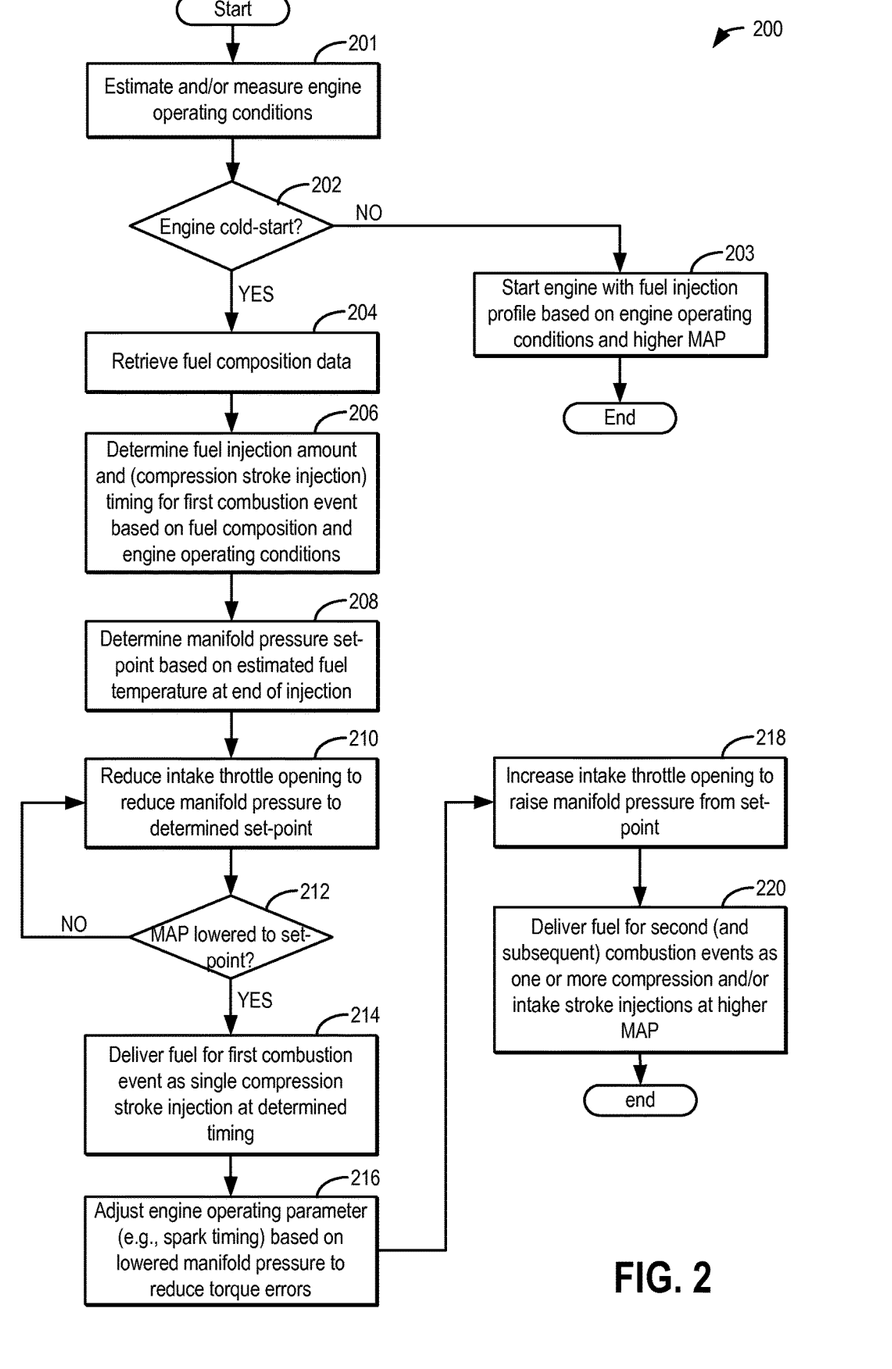
FIG. 2 shows a high level flow chart illustrating a routine that may be implemented for starting an engine during a cold-start condition with lowered manifold pressure.

FIG. 2 describes an example control system routine 200 for adjusting an intake manifold pressure during an engine cold-start to improve engine startability. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 201, engine operating conditions may be measured and/or estimated. These may include an ambient conditions (ambient temperature, ambient humidity, ambient pressure), air charge temperature, engine speed, manifold pressure, catalyst temperature, barometric pressure, driver demand, fuel tank fill level, alcohol content of fuel, etc. At 202, it may be confirmed whether the engine is in a cold-start condition. In one example, an engine cold-start may be confirmed if the engine temperature (or ambient temperature, or engine catalyst temperature) is below a threshold temperature and/or a threshold duration since a previous engine shutdown has elapsed.

If an engine cold-start is not confirmed, at 203, the method includes operating the engine with a fuel injection profile based on engine operating conditions. For example, the engine may be started during a hot start with a hot start fuel injection profile. As such, if a cold start condition is not confirmed, no adjustments to manifold pressure may be made. That is, manifold pressure may be maintained at a higher level.

Upon confirmation of engine cold-start conditions, at 204, the method includes retrieving fuel composition data. For example, the fuel alcohol content (or octane content) may be retrieved. In one example, the fuel composition may be determined based on a previous engine operation. In another example, the fuel composition may be determined based on a fuel tank filling event. Alternatively, the fuel composition may be determined based on the output of a fuel composition sensor, such as a fuel alcohol sensor.

At 206, a fuel injection setting may be determined for a first combustion event in each cylinder at the engine cold-start based on the estimated engine operating conditions, and further based on the fuel composition. The fuel injection settings determined may include an amount of fuel to be injected on the first combustion event, as well as a timing of the injection. Determining the fuel injection timing may include, for the first combustion event in each cylinder of the engine, determining a stroke in which the fuel is to be injected, a start of injection timing, an end of injection timing, a duration of the injection, as well as a duty cycle pulse for the fuel injector. Further still, it may be determined if the fuel is to be delivered as a port injection, or a direct injection. For example, the start of injection timing and/or the end of injection timing may vary with engine speed, load, fuel alcohol content, engine temperature, or other parameters. In one example, it may be determined that fuel is to be delivered on the first combustion event of each cylinder during the cold-start as a single compression stroke injection.

At 208, a manifold pressure set-point is determined based on an estimated fuel temperature at the end of the injection. As elaborated below, the manifold pressure is lowered for the first combustion event in each cylinder during the cold-start to a set-point based on a change in boiling point of the fuel to be injected with (change in) manifold pressure. As such, a drop in the manifold pressure lowers the fuel boiling point. As the fuel boiling point drops while aircharge temperature remains the same, a difference between the fuel boiling point and aircharge temperature increases, improving evaporation of the fuel and formation of a homogeneous air-fuel mixture. At the same time as the improvement in fuel evaporation, however, the drop in manifold pressure also results in a drop in charge volume in each cylinder during the first cylinder combustion event. As a result, the amount of fuel needed to provide a homogeneous and stoichiometric (or other air-fuel ratio) mixture decreases. By optimizing or balancing between the two, and learning iteratively, a manifold pressure set-point may be determined.

Figure 3:
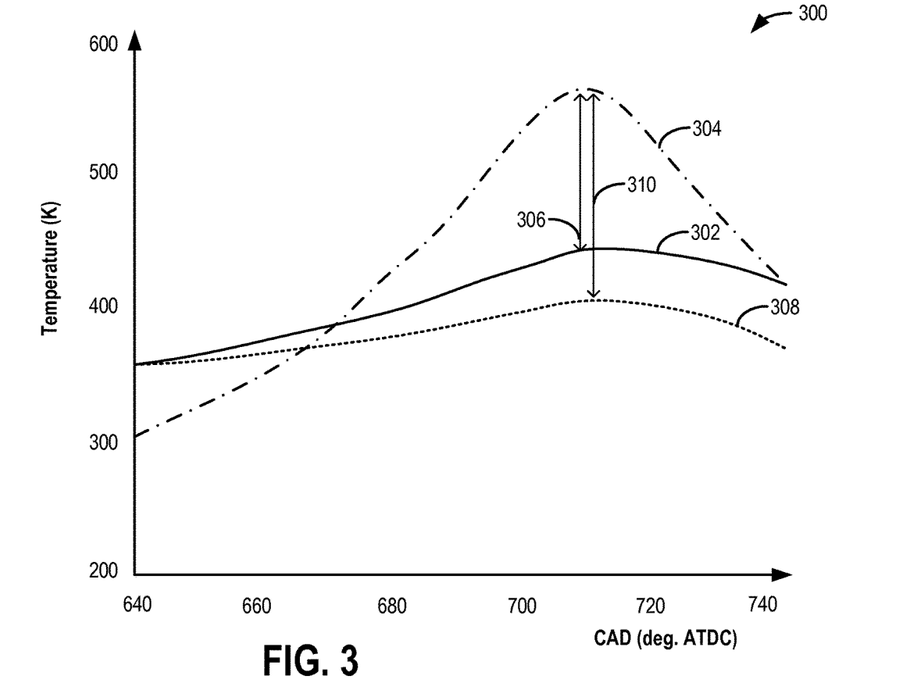
FIG. 3 shows a map depicting variation in fuel boiling point over a cylinder compression stroke.

Map 300 of FIG. 3 depicts the temperature difference between the boiling point of a fuel and an aircharge temperature during an engine start with fuel injected on a compression stroke and the effect of this temperature difference on fuel evaporation. Map 300 depicts temperature along the y-axis and engine position (in crank angle degrees) along the x-axis, with the range depicting a compression stroke. In the depicted example, the injected fuel is E100. The engine is a 2 L 4-cylinder direct injected engine operating at an ambient condition of −5° C., at 250 rpm. Fuel is injected during a compression stroke with intake valve closing (IVC) at 615 CAD and the end of injection is set around TDC, specifically at 720 CAD.

Aircharge temperature in a cylinder during a compression stroke is shown at plot 304 (dashed). Change in boiling point of a fuel injected into the cylinder (herein the fuel being E100) during the compression stroke is shown at plot 302 (solid line). Herein, the engine start is at a fixed fueling amount at a manifold pressure of 100 kPa. The boiling point of the E100 fuel as a function of crank angle shows the increasing boiling point temperature of the fuel with in-cylinder pressure. Fuel evaporation is driven by a difference 306 between the fuel boiling point and the aircharge temperature, herein also referred to as delta temperature. Specifically, as the delta temperature (or difference) increases, fuel evaporation improves.

A manifold pressure set-point may be selected that is lower than the nominal manifold pressure set-point to improve fuel evaporation. For example, the manifold pressure may be lowered from 100 kPa to 70 kPa. Plot 308 (dashed line) depicts a change in boiling point of the fuel injected into the cylinder during the compression stroke at a manifold pressure of 70 kPa. The boiling point of the E100 fuel as a function of crank angle at the lower manifold pressure shows a similar trend with the increasing boiling point temperature of the fuel with in-cylinder pressure. However, at the lower manifold pressure, the fuel boiling point is lowered, resulting in a larger difference 310 between the fuel boiling point and the aircharge temperature. That is, a larger delta temperature is enabled, improving fuel evaporation.

Figure 4:
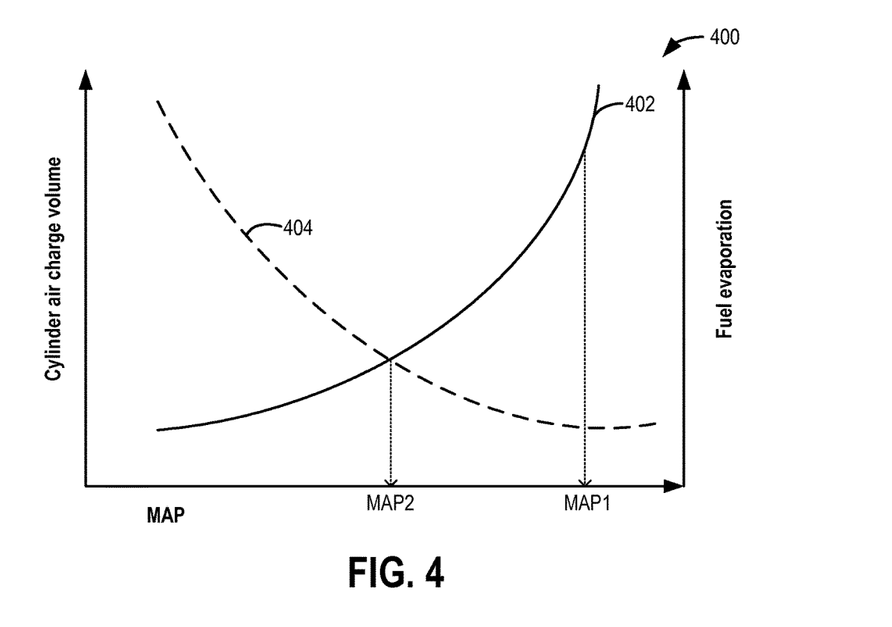
FIG. 4 shows a map that may be used for selecting a manifold pressure set-point during an engine set-point based on change in fuel boiling point relative to change in charge volume at different MAP values.

Map 400 of FIG. 4 depicts the optimization or selection of the manifold pressure set-point. Specifically, map 400 depicts manifold pressure (MAP) along the x-axis, cylinder charge volume along a first y-axis, and an amount of fuel evaporation along a second y-axis. Plot 402 (solid line) shows the relationship between cylinder charge volume and MAP. As MAP during a cylinder intake stroke decreases, cylinder charge mass decreases. In other words, there is less air in the cylinder. Plot 404 (dashed line) shows the relationship between fuel evaporation and MAP. As MAP during a cylinder intake stroke decreases, fuel evaporation increases (due to a less dense air). In other words, there is more fuel in the cylinder. To allow a homogeneous air-fuel mixture of a target air-fuel ratio to be made, a balance must be struck between the reduced need for fuel (due to the smaller air volume) and the increase availability of fuel (due to the higher evaporation). In one example, a point of intersection between the lines may be used to identify the manifold pressure set-point. In the depicted example, the MAP set-point may be lowered from the nominal value MAP1 (e.g., 100 kPa) to MAP2 (e.g., 70 kPa).

Returning to 208, as described above, the manifold pressure may be lowered to a set-point based on a change in the boiling point of the injected fuel with pressure. Specifically, the manifold pressure set-point is selected based on the (estimated or predicted or modeled) change in boiling point of the injected fuel relative to a (estimated or predicted or modeled) change in volume of cylinder aircharge with pressure. In other examples, the lowering may be to a set-point based on an expected air-fuel ratio in the cylinder at the end of the injection. For example, the set-point may be adjusted to maintain the air-fuel ratio at a target ratio (e.g., at or around stoichiometry). In some examples, the lowering may be further based on an alcohol content of the injected fuel, the manifold pressure lowered to a smaller value as the alcohol content of the injected fuel increases.

At 210, the method includes lowering the manifold pressure to the determined set-point by reducing an opening of an intake throttle. For example, the lowering may include actuating an electro-mechanical actuator coupled to the intake throttle valve to move the valve towards a more closed position based on a signal received at the actuator from the controller. In one example, the throttle may be held closed transiently until the MAP set-point is reached.

At 212, it may be confirmed that MAP has been lowered to the determined set-point. If not, the method returns to 210 to continue actuating the throttle valve towards a less open position. If it is confirmed that MAP has been lowered to the determined set-point, at 214, the method includes injecting fuel as a single compression stroke injection on the first combustion event in each cylinder at the cold-start. Fuel may be injected with the amount and timing previously determined (at 206). In other words, delivery of fuel for the first combustion event in each cylinder is delayed until MAP has been sufficiently lowered, thereby ensuring that the injected fuel can evaporate sufficiently to form a homogeneous air-fuel mixture.

As such, reducing the manifold pressure may subtly increase the starting time of the engine (e.g., from 0.5 seconds to 0.7 seconds). However, the engine start time at cold ambient conditions, such as at 5° C., is in a higher range, such as about 2-3 seconds. Under these conditions, the lowering of the manifold pressure does not substantially increase the engine cold-start time. In fact, due to the improved evaporation of the fuel with the reduced MAP, the engine cold-start time may be improved, such as from 2-3 seconds to about 1.2-2 seconds.

At 216, the method includes adjusting one or more engine operating parameters based on the lowered manifold pressure to reduce torque errors or torque disturbances. For example, one or more of an ignition spark timing and a fuel rail pressure may be adjusted for the first combustion event in each cylinder based on the lowered manifold pressure. For example, during a first condition, when the lowered manifold pressure results in a richer than desired air-fuel ratio, spark timing may be advanced or retarded to reduce the torque error. As another example, during a second condition, when the lowered manifold pressure results in a leaner than desired air-fuel ratio, spark timing may be advanced or retarded to reduce the torque error. However, if the mixture is too lean, more fuel may be needed to achieve the desired torque.

At 218, upon completion of the first combustion event in each cylinder during the engine cold-start, the method includes raising the manifold pressure for a second combustion event immediately following the first combustion event in each cylinder, with no intervening combustion events. For example, the raising may include actuating the electro-mechanical actuator coupled to the intake throttle valve to move the valve towards a more open position based on a signal received at the actuator from the controller.

At 220, the method includes delivering fuel for the second, and subsequent combustion events in each cylinder at the engine cold-start as one or more compression stroke and/or intake stroke injections. For example, the controller may transition fuel injection to a split injection on the second combustion event in a cylinder, the split injection including a first portion of fuel delivered as an intake stroke injection and a second, remaining portion of the fuel delivered as a compression stroke injection, a ratio of the first portion relative to the second portion adjusted based on temperature. Herein, the temperature may be one of a fuel temperature, an engine temperature, an exhaust catalyst temperature, and an ambient temperature. The ratio of the first portion relative to the second portion may be increased as the temperature increases. The ratio may be further based on an alcohol content of the injected fuel, the ratio of the first portion relative to the second portion decreased as the alcohol content of the injected fuel increases.

Further, the ratio of fuel delivered in the intake stroke relative to the compression stroke, as well as the number of injections used for a split injection (if a split injection is used) may be further based on a combustion event number. For example, after the first combustion event in each cylinder, fuel may be delivered as a split intake and/or compression injection for a number of combustion events, after which fueling may be transitioned to a single intake stroke injection.

In this way, by lowering an intake manifold pressure for a first combustion event of an engine cold-start as an estimated fuel temperature at an end of the injection decreases, fuel evaporation is improved, even when operating with an alcohol fuel. In addition, the lower manifold pressure enables misfire event occurrence to be reduced.

Figure 5:
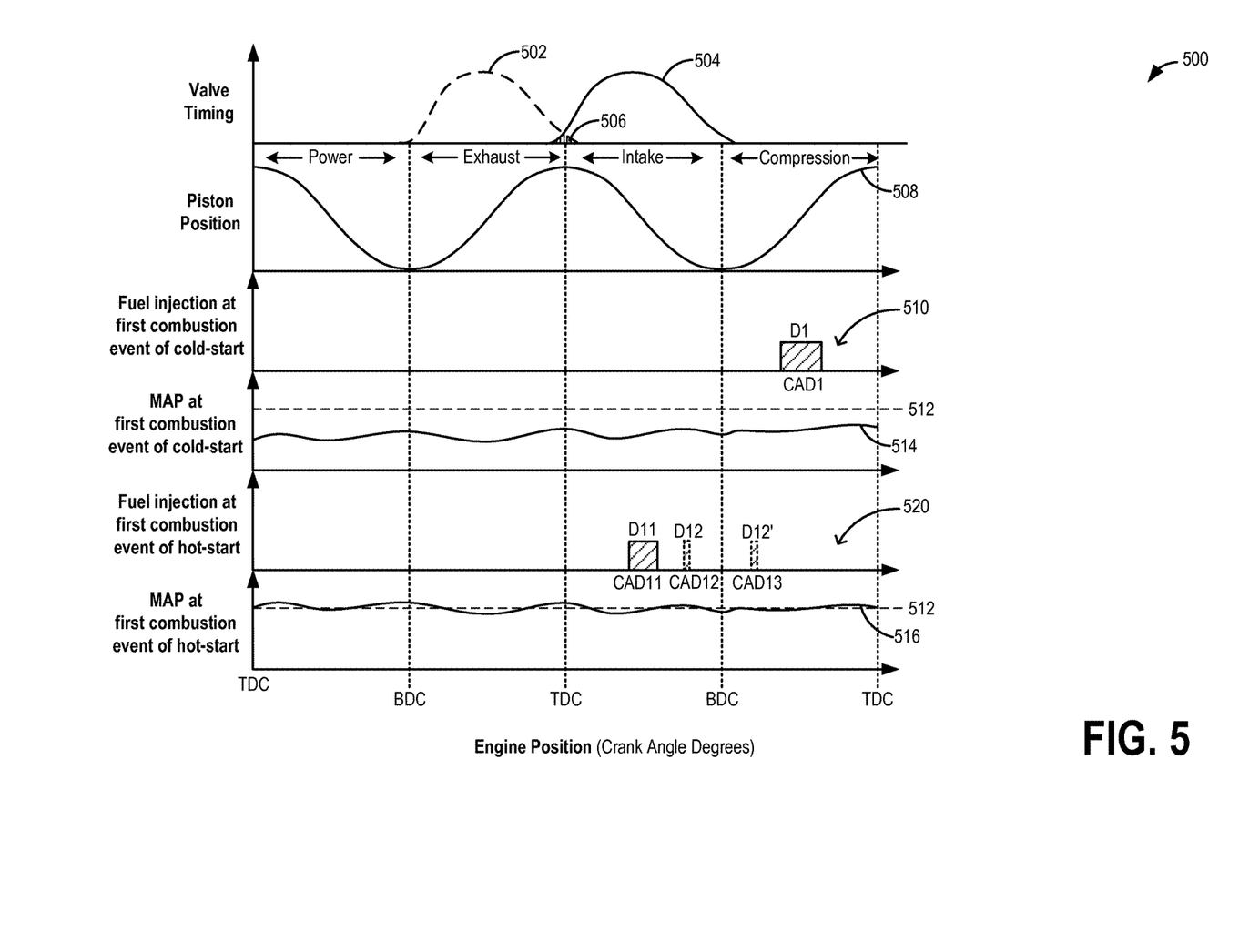
FIGS. 5-6 show example cold-start fuel injections according to the present disclosure.

Now turning to FIG. 5, a map 500 of valve timing and piston position, with respect to an engine position, for an engine cylinder receiving fuel for a first combustion event of an engine start is shown. During an engine start, while the engine is being cranked, an engine controller may be configured to adjust a manifold pressure (MAP) for a first combustion event in an engine cylinder at an engine cold-start to improve fuel evaporation. No MAP adjustments may be performed in the event of an engine hot-start, as described below. It will be appreciated that as used herein, the first combustion event refers to a first combustion event in a first cylinder to fire during the engine starts. However, similar profiles may be used for a first combustion event in each cylinder during the engine starts.

Map 500 illustrates an engine position along the x-axis in crank angle degrees (CAD). Curve 508 depicts piston positions (along the y-axis), with reference to their location from top dead center (TDC) and/or bottom dead center (BDC), and further with reference to their location within the four strokes (intake, compression, power and exhaust) of an engine cycle. As indicated by sinusoidal curve 508, a piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke.

Curves 502 and 504 depict valve timings for an exhaust valve (dashed curve 502) and an intake valve (solid curve 504) during a normal engine operation. As illustrated, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced.

As a result of the timing differences between exhaust valve closing and intake valve opening, for a short duration, before the end of the exhaust stroke and after the commencement of the intake stroke, both intake and exhaust valves may be open. This period, during which both valves may be open, is referred to as a positive intake to exhaust valve overlap 506 (or simply, positive valve overlap), represented by a hatched region at the intersection of curves 502 and 504. In one example, the positive intake to exhaust valve overlap 506 may be a default cam position of the engine present during an engine cold start.

The third plot (from the top) of map 500 depicts an example fuel injection profile 510 that may be used for a first combustion event of an engine cold-start to reduce engine cold-start roughness and improve engine startability. Curve 514 depicts MAP at the first combustion event of the engine cold-start. The fifth plot (from the top) of map 500 depicts an example fuel injection profile 520 that may be used for a first combustion event of an engine hot-start. Curve 516 depicts MAP at the first combustion event of the engine hot-start.

In the depicted example, fuel injection profile 510 used during a first combustion event of an engine cold-start includes a single compression stroke injection D1 with an amount of fuel delivered to the cylinder during a compression stroke, the fuel direct injected at timing CAD1. In addition, for the first combustion event of the engine cold-start, manifold pressure (plot 514) is lowered from a nominal setting 512 to allow for a larger delta temperature between a boiling point of the injected fuel and an aircharge temperature.

In comparison, fuel injection profile 520 used during a first combustion event of an engine hot-start includes a split injection with a total amount of fuel delivered to the cylinder as a first, intake stroke direct injection D11 and either an additional intake stroke injection D12 or an additional compression stroke injection D12'. A first larger portion of the total fuel amount is direct injected in the intake stroke at a first timing CAD11. Then, a remaining portion of the fuel is direct injected at CAD12 in the intake stroke, or at CAD13 in the compression stroke. In addition, for the first combustion event of the engine hot-start, manifold pressure (plot 516) is held at nominal setting 512 since fuel evaporation at the hot-start is not an issue.

It will be appreciated that in some examples, the total fuel delivered on the first combustion event of the engine hot-start may include intake stroke injection D11 as well as each of intake stroke injection D12 and compression stroke injection D12'. Further, spark timing (not shown) may be retarded by a larger amount during the first combustion event of the engine cold-start as compared to the hot-start.

Figure 6:
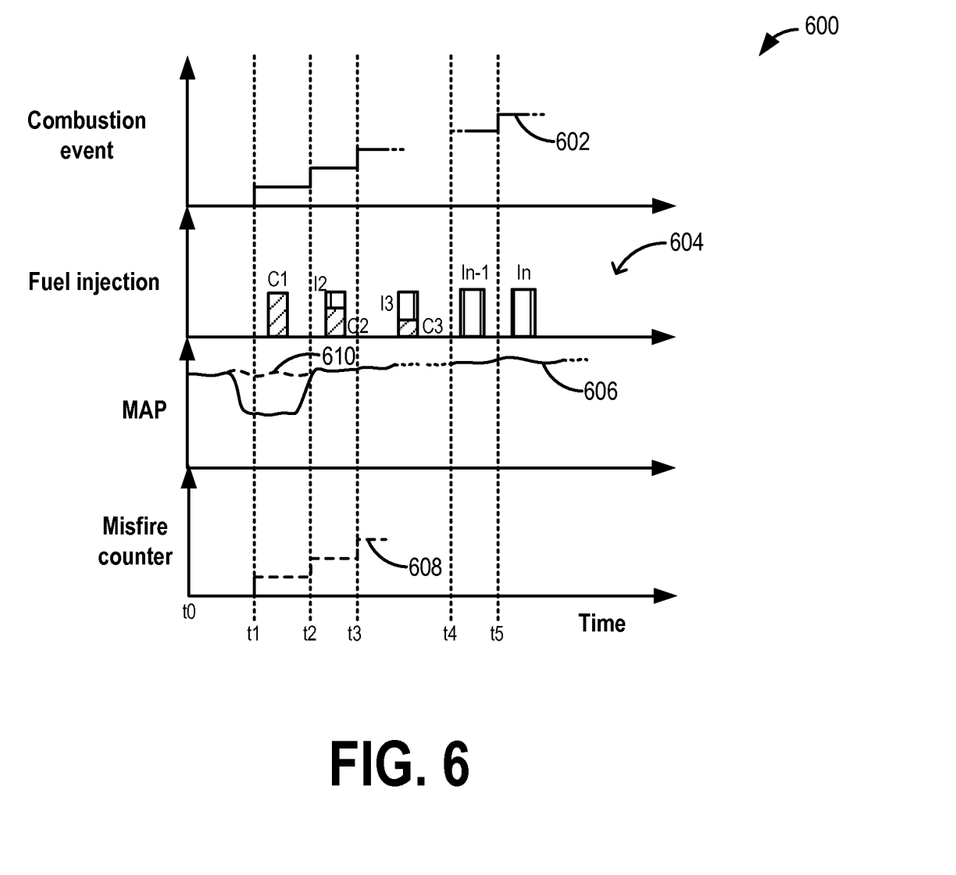

Now turning to FIG. 6, map 600 shows an example adjustment of fuel injection profile and MAP during an engine cold-start, and subsequent cranking. Map 600 depicts the output of a combustion event number counter at plot 602, fuel injection profiles at plot 604, MAP at plot 606, and the output of a misfire counter at plot 608. It will be appreciated that as used herein, the combustion event counter counts combustion events occurring in a given engine cylinder. Thus, a first combustion event refers to a first combustion event in a first cylinder to fire during the engine start, and subsequent combustion events refer to subsequent combustion events in the given cylinder (after the first combustion event) at the engine start. As such, it will be appreciated that similar profiles may be applied for a first combustion event in each cylinder of the engine during the engine hot or cold start.

At t0, an engine start command may be received. Due to ambient conditions being below a threshold temperature, the engine start at t1 may constitute an engine cold-start. Between t0 and t1, the engine may be cranked with a starter motor. At or shortly after t1, fuel may be delivered for a first combustion event. However, to improve fuel vaporization on the first combustion event of the cold-start, prior to t1, MAP may be reduced. In one example, MAP is reduced by reducing an opening of an intake throttle. For example, the throttle may be held closed for a duration until the MAP is lowered to a predetermined set-point. Thereafter, throttle opening may be adjusted based on operating conditions and desired airflow. Once the MAP is lowered, fueling is commenced for the first combustion event. Herein, on the first combustion event, fuel is delivered as a single compression stroke injection C1 (hatched bar).

At or shortly after t2, fuel may be delivered for a second combustion event. However, the fuel may be sufficiently warm at the second combustion event such that further maintenance of lower MAP is not required for fuel vaporization. Accordingly, upon completion of the first combustion event, and shortly before the second combustion event of the cold-start (that is, prior to t2), MAP may be raised. In one example, MAP is raised by increasing an opening of the intake throttle. Once the MAP is raised, fueling is commenced for the second combustion event. Herein, on the second combustion event, fuel is delivered as a first intake stroke injection I2 (lined bar) and a second compression stroke injection C2 (hatched bar), the injection including a higher ratio of fuel in the compression stroke injection as compared to the intake stroke injection. For the subsequent, third combustion event, and all combustion events thereafter, MAP is held at the higher value. In addition, on the third combustion event fuel is delivered as a first intake stroke injection I3 (lined bar) and a second compression stroke injection C3 (hatched bar), the injection including a higher ratio of fuel in the intake stroke injection as compared to the compression stroke injection. In addition, by the time engine idle control is achieved at or after t4, MAP is held at the higher value and combustion events (such as event n−1 and n) are fueled with intake stroke injected fuel (In−1 and In, for example).

By reducing the MAP during the first combustion event, fuel evaporation is improved. In addition, misfire event occurrence is reduced. As such, if MAP were not lowered for the first combustion event, as indicated by dashed segment 610, more misfire events may have occurred, as indicated by the output of a misfire counter at 608 (dashed plot).

In one example, a method for an engine comprises: for a first combustion event of each cylinder of an engine during an engine cold-start, lowering manifold pressure to a set-point selected based on change in boiling point of an injected fuel with pressure relative to a change in volume of cylinder aircharge with pressure; and delivering fuel to a cylinder as a single compression stroke injection at the lower manifold pressure. In the above example, the set-point selected based on the change in boiling point of the injected fuel with pressure relative to the change in volume of cylinder aircharge with pressure may additionally or optionally include the set-point selected based on an expected air-fuel ratio of the cylinder at an end of the injection, the expected air-fuel ratio based on the change in the boiling point of the injected fuel and the change in the volume of the cylinder charge. In any or all of the preceding examples, the lowering additionally or optionally includes actuating an actuator coupled to an intake throttle valve to move the throttle valve towards a more closed position. In any or all of the preceding examples, the lowering includes lowering from a first manifold pressure to the set-point, the first manifold pressure based on one or more ambient temperature and alcohol content of the injected fuel. Any or all of the preceding examples may additionally or optionally further comprise, for a second combustion event of each cylinder, immediately following the first combustion event of each cylinder of the engine cold-start (with no event in between), raising the manifold pressure to the first manifold pressure and delivering fuel as one or more intake stroke injections, at the higher manifold pressure. Any or all of the preceding examples may additionally or optionally further comprise adjusting one or more of an ignition spark timing and a fuel rail pressure based on engine torque output at the lowered manifold pressure relative to driver torque demand.

Another example method for an engine comprises: during an engine cold-start, determining a fuel injection including an amount of fuel and a timing of injection based on engine operating conditions; and lowering manifold pressure for a first combustion event of each cylinder of the engine at the cold-start based on an estimate of fuel temperature at an end of the injection. In the preceding example, the lowering optionally includes lowering the manifold pressure to a set-point based on a change in boiling point of the injected fuel with pressure. In any or all of the preceding examples, the set-point is additionally or optionally based on the change in boiling point of the injected fuel relative to a change in volume of cylinder aircharge with pressure. In any or all of the preceding examples, the lowering is additionally or optionally further based on an alcohol content of the injected fuel, the manifold pressure lowered to a smaller value as the alcohol content of the injected fuel increases. In any or all of the preceding examples, the lowering additionally or optionally includes reducing an opening of an intake throttle. Any or all of the preceding examples may additionally or optionally further comprise raising the manifold pressure for a second combustion event immediately following the first combustion event of each cylinder, and injecting fuel as a single compression stroke injection on the first combustion event of each cylinder. Any or all of the preceding examples may additionally or optionally further comprise transitioning fuel injection to a split injection on the second combustion event, the split injection including a first portion of fuel delivered as an intake stroke injection and a second, remaining portion of the fuel delivered as a compression stroke injection, a ratio of the first portion relative to the second portion adjusted based on temperature. In any of the preceding examples wherein the ratio is adjusted based on temperature, the temperature is optionally one of a fuel temperature, an engine temperature, an exhaust catalyst temperature, and an ambient temperature, and the ratio of the first portion relative to the second portion is increased as the temperature increases. In any of the preceding examples, the ratio is additionally or optionally further based on an alcohol content of the injected fuel, the ratio of the first portion relative to the second portion decreased as the alcohol content of the injected fuel increases. Any of the preceding examples may additionally or optionally further comprise adjusting one or more of an ignition spark timing and a fuel rail pressure based on the lowered manifold pressure.

In yet another example, a first example engine system coupled to a vehicle may comprise an engine with an intake manifold, and one or more engine cylinders; a direct injector for direct injecting fuel into an engine cylinder; a throttle valve coupled in the intake manifold, an opening of the valve adjusted by an electromechanical actuator; a pressure sensor for estimating a pressure of the intake manifold; and a controller. The controller may be configured with computer-readable instructions stored on non-transitory memory for: during a first engine cold-start, delivering fuel on a first combustion event of each engine cylinder at a higher manifold pressure, and then increasing manifold pressure above the higher manifold pressure after the first combustion event. The controller may be further configured for: during a second engine cold-start, delivering fuel on a first combustion event of each engine cylinder at a lower manifold pressure, and then increasing manifold pressure to the higher manifold pressure after the first combustion event. In the preceding example engine system, ambient temperature during the second engine cold-start is at a lower temperature. In the preceding example engine system, additionally or optionally, during the first engine cold-start, fuel is delivered on the first combustion event of each cylinder as each of an intake stroke injection and a compression stroke injection, while during the second engine cold-start, fuel is delivered on the first combustion event of each cylinder as a single compression stroke injection.

In this way, the ability to start an engine with gasoline and alcohol fuels, such as E100 or E85, at very cold temperatures is improved. The improvement is achieved without the need for auxiliary fuel heating systems such as heated fuel rails, gasoline injector starts, pilot injections, heated injectors, etc. By enabling a larger portion of the injected fuel to be evaporated on the cold-start, feed-gas hydrocarbon emissions can be significantly reduced. In addition, by reducing the load at the engine start, engine speed flare can be reduced. By reducing the occurrence of engine misfires during an engine cold-start, advantages of lower emissions and reliable and predictable engine starts are achieved. Overall, engine startability on cold-starts is improved.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine comprising:
during an engine cold-start,
determining a fuel injection including an amount of fuel and a timing of direct injection based on engine operating conditions;
lowering manifold pressure for a first combustion event of each engine cylinder at the cold-start based on an estimate of fuel temperature at an end of the direct injection, while maintaining air charge temperature;
raising the manifold pressure for a second combustion event in each engine cylinder, the second combustion event immediately following the first combustion event of each engine cylinder;
injecting fuel as a single compression stroke injection on the first combustion event of each engine cylinder; and
transitioning fuel injection to a split direct injection on the second combustion event, the split direct injection including a first portion of fuel delivered in cylinder as an intake stroke injection and a second, remaining portion of the fuel delivered in cylinder as a compression stroke injection.

2. The method of claim 1, wherein the lowering includes lowering the manifold pressure to a set-point based on a change in boiling point of the injected fuel with pressure.

3. The method of claim 2, wherein the set-point is based on the change in boiling point of the injected fuel relative to a change in volume of cylinder aircharge with pressure.

4. The method of claim 2, wherein the lowering is further based on an alcohol content of the injected fuel, the manifold pressure lowered to a smaller value as the alcohol content of the injected fuel increases.

5. The method of claim 1, wherein lowering manifold pressure includes reducing an opening of an intake throttle.

6. The method of claim 1, wherein a ratio of the first portion relative to the second portion is adjusted based on temperature.

7. The method of claim 6, wherein the temperature is one of a fuel temperature, an engine temperature, an exhaust catalyst temperature, and an ambient temperature.

8. The method of claim 6, wherein the ratio of the first portion relative to the second portion is increased as the temperature increases.

9. The method of claim 6, wherein the ratio is further based on an alcohol content of the injected fuel, the ratio of the first portion relative to the second portion decreased as the alcohol content of the injected fuel increases.

10. The method of claim 1, further comprising adjusting one or more of an ignition spark timing and a fuel rail pressure based on the lowered manifold pressure.

11. An engine system coupled to a vehicle, comprising:
an engine with an intake manifold and one or more engine cylinders;
a direct injector for direct injecting fuel into an engine cylinder;
a throttle valve coupled in the intake manifold, an opening of the valve adjusted by an electromechanical actuator;
a pressure sensor for estimating a pressure of the intake manifold; and
a controller configured with computer-readable instructions stored on non-transitory memory for:
during a first engine cold-start, delivering fuel on a first combustion event of each of the one or more engine cylinders at a higher manifold pressure, and then increasing manifold pressure above the higher manifold pressure after the first combustion event; and
during a second engine cold-start, lowering manifold pressure to a lower manifold pressure lower than the higher manifold pressure, delivering fuel on a first combustion event of each of the one or more engine cylinders at the lower manifold pressure, the lower manifold pressure being lowered based on an estimate of fuel temperature at an end of the injection, and then increasing manifold pressure to the higher manifold pressure after the first combustion event for a second combustion event in each of the one or more engine cylinders, the second combustion event immediately following the first combustion event of each of the one or more engine cylinders, fuel injected as a single compression stroke injection on the first combustion event of each of the one or more engine cylinders, and transitioning fuel injection to a split injection on the second combustion event, the split injection including a first portion of fuel delivered as an intake stroke injection and a second, remaining portion of the fuel delivered as a compression stroke injection.

12. The system of claim 11, wherein an ambient temperature during the second engine cold-start is at a lower temperature, and wherein during the first engine cold-start, fuel is delivered on the first combustion event of each of the one or more engine cylinders as each of an intake stroke injection and a compression stroke injection.

13. A method for an engine comprising:
during an engine cold-start,
determining a fuel injection including an amount of fuel and a timing of injection based on engine operating conditions;
lowering manifold pressure for a first combustion event of each engine cylinder at the cold-start based on an estimate of fuel temperature at an end of the injection, raising the manifold pressure for a second combustion event in each engine cylinder, the second combustion event immediately following the first combustion event of each engine cylinder;
injecting fuel as a single compression stroke injection on the first combustion event of each engine cylinder; and
transitioning fuel injection to a split injection on the second combustion event, the split injection including a first portion of fuel delivered as an intake stroke injection and a second, remaining portion of the fuel delivered as a compression stroke injection, a ratio of the first portion relative to the second portion adjusted based on temperature.

14. The method of claim 13, wherein the lowering includes lowering the manifold pressure to a set-point based on a change in boiling point of the injected fuel with pressure.

15. The method of claim 14, wherein the set-point is based on the change in boiling point of the injected fuel relative to a change in volume of cylinder aircharge with pressure.

16. The method of claim 14, wherein the lowering is further based on an alcohol content of the injected fuel, the manifold pressure lowered to a smaller value as the alcohol content of the injected fuel increases.

17. The method of claim 13, wherein lowering manifold pressure includes reducing an opening of an intake throttle.

* * * * *